Jan. 17, 1928.

J. ANDREWS 1,656,463

CAR COUPLING

Filed Dec. 13, 1924

J. Andrews, Inventor

By Richard B. Owen,
Attorney

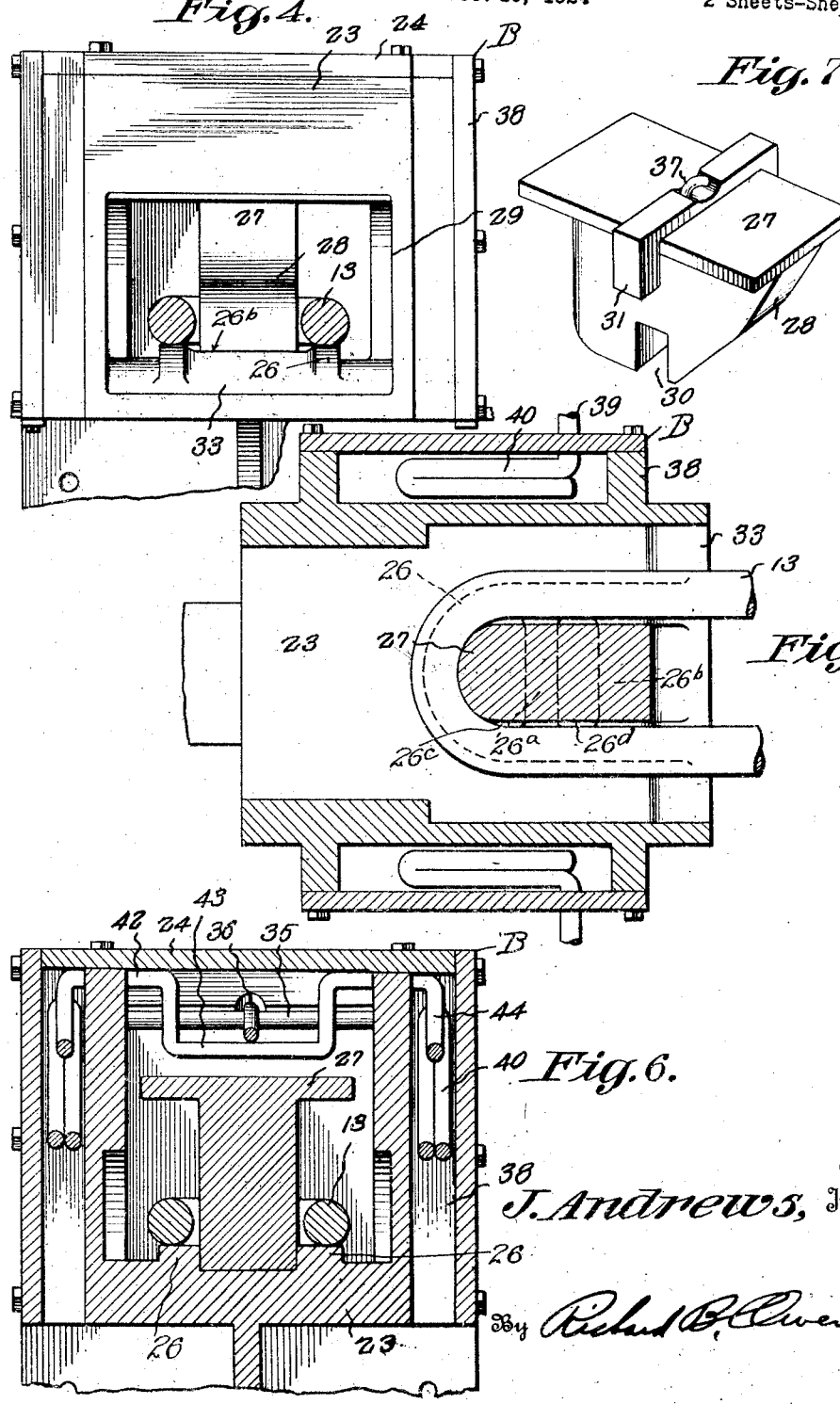

Patented Jan. 17, 1928.

1,656,463

UNITED STATES PATENT OFFICE.

JOHN ANDREWS, OF NOKOMIS, ILLINOIS.

CAR COUPLING.

Application filed December 13, 1924. Serial No. 755,753.

The present invention relates to car couplings and has for its prime object to provide an improved structure whereby the coupling members may be engaged with each other or disengaged from each other without the necessity of a man going between the cars.

Another important object of the invention is to provide a coupling mechanism which is easy to operate and possesses a very simple and efficient construction but is yet thoroughly reliable in operation, comparatively inexpensive to manufacture, strong, durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 4 is an enlarged section taken substantially on the line 4—4 of Figure 2 looking to the left, Figure 5 is a horizontal section through the member shown in Figure 4, Figure 6 is a vertical section therethrough, and Figure 7 is a detail perspective view showing the bolt.

Figure 1:
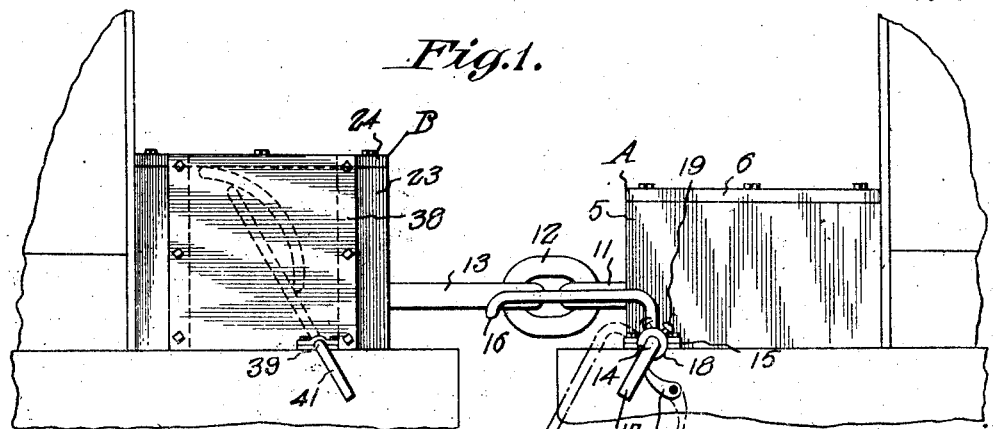
Figure 1 is an enlarged side elevation of the coupling mechanism.
Figure 2:
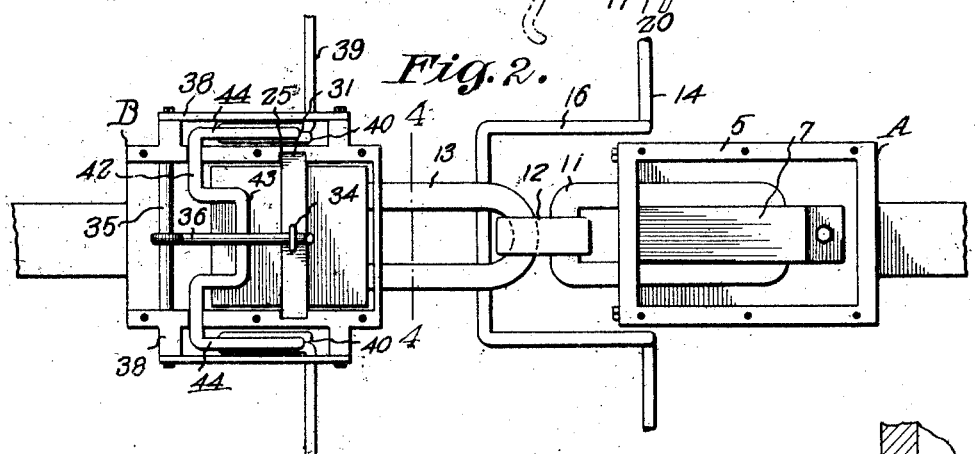
Figure 2 is a top plan view thereof with the covers removed.
Figure 3:
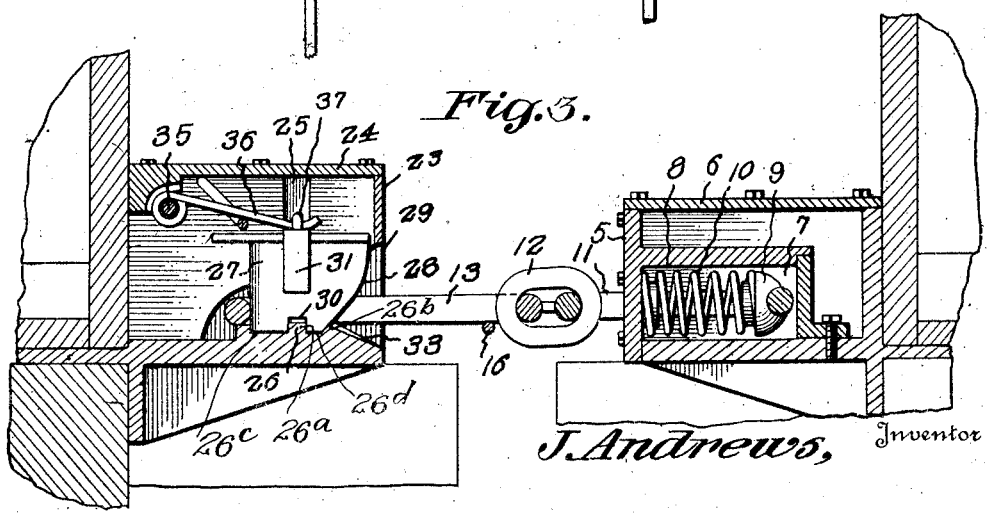
Figure 3 is a longitudinal vertical section therethrough.

Referring to the drawing in detail it will be seen that A designates the coupling member on one car and B the coupling member on the other car. The member A includes a housing 5 with the detachable cover 6. A compartment 7 is formed in the housing 5 and a spring 8 is mounted therein one end of which is connected with a grooved head 9. The sides of the compartment 7 are provided with elongated slots 10. A link 11 passes through openings provided in the front walls of the casing 5 and through the slots 10 and is engaged with the head 9. A link 12 connects the link 11 with a link 13 forming part of the other coupling B.

The link 13, however, is only detachably associated with the coupling member B and in order that it may be held in a horizontal position and engaged by the coupling member B when the cars are to be coupled, I provide a crank shaft 14 extending transversely of one end of the car to which the coupling A is attached. This crank shaft 14 is journaled as at 15 and includes the intermediate crank 16 and the end cranks 17. The cranks 17 are used to operate the crank shaft while the crank 16 is used to engage the link 13 for holding it in a substantially horizontal position for engagement by the coupling member B. A collar 18 is attached at each end of the crank shaft 14 by means of a set screw 19 or the like and a dog or pawl 20 is pivoted on each side of the car for engaging notches in the collar whereby the crank shaft may be held in such a position that the intermediate crank 16 will sustain the link 13 in its engaging or horizontal position thus relieving the operator of the necessity of holding on to one of the end cranks 17 as the cars are being coupled. The coupling member A acts as a buffer because of the spring 8 as the cars are started and allows the desired slow take up.

The coupling member B is constructed with a housing 22 having a removable cover 24. The side walls of the housing 23 are provided with vertically extending grooves 25 while the bottom wall is provided upon its inner face with a U-shaped raised rib 26, having the transversely extending bars 26$^a$ and 26$^b$ connecting between the legs of the rib and forming the pockets 26$^c$ and 26$^d$. A keeper is provided which constitutes an upstanding body 27 having a beveled front face 28 which is directed toward the opening 29 and on its bottom the body is provided with a transverse notch 30 for receiving the inner cross bar 26$^a$, the lower part of the keeper feeding in the pockets 26$^c$ and 26$^d$. On the upper side the keeper is provided with a projection 31 to be received in a groove 25. It will thus be seen that when the link 13 is substantially horizontally disposed it will be guided by the floating surface 33 of the bottom of the housing 23 to engage the beveled edge 28 of the bolt thereby lifting the bolt off of its seat or the bottom of the casing and to pass by the bolt after which the bolt will fall to the position shown in Figure 5 thus locking the link in engagement with the coupling member B. A pin 35 extends transversely of the housing 23 and arm 36 is rotatably engaged therewith at one end and fixed to the upper surface of the bolt 23 as at 37. Compartments 38 are built on the sides of the housing 23 and cranks 39 extend thereinto so that one arm thereof as at 40 is movable therein, the other arm 41 being disposed alongside of the car. Of course, there is one of these cranks 39 for each compartment 38. This allows the release of the bolt to either side of the car as will be evident as the description progresses farther. A crank-shaft 42 is journaled in the upper edge of the housing and includes the intermediate shaft 43 which is engageable under the arm 36 and the end arms or cranks 44 which are actuatable by the arms 40 of the cranks 39.

It will be apparent from the foregoing that I have devised a novel construction of car coupling apparatus, which will be strong, durable, and effective under all conditions and which is not liable to readily get out of order. It will also be apparent that the novel construction of the coupling apparatus allows it to be operated from the sides of the cars and eliminates the necessity of a man going between the cars when coupling or uncoupling the same. This coupling apparatus embodies the features of advantage enumerated as desirable in the statement of the invention, and the above description, and while I have in the present instance shown and described a preferred embodiment of it which gives in practice satisfactory and reliable results, it is to be understood that the same is susceptible of modification in various particulars without departing from the spirit or scope of the invention as hereinafter claimed or sacrificing any of its advantages.

Having thus described my invention, what I claim as new is:

1. A car coupling unit of the character described designed to receive a coupling link of an adjacent car, comprising a housing having a bottom and side walls and a forwardly opening portion, said bottom having a centrally arranged raised portion having a depression in the top thereof, a vertically shiftable keeper body slidably mounted between said side walls and adapted to locate in said depression when in active position, said keeper body having the lower portion of the forward face thereof rearwardly inclined, and means to guide said link member over said raised portion when the link is pressed against said inclined face to lift the keeper member from its seat, to permit said link to be positioned for the extension of the keeper therethrough.

2. A car coupling unit of the character described designed to cooperate with a coupling link of an adjacent car, comprising a housing body including a bottom wall and spaced vertical side walls, said bottom wall having the forward portion inclined upwardly and inwardly, a substantially U-shaped forwardly directed rib formed upon the top of said bottom wall, having upstanding bars connected across the legs thereof to set up pocket seats, a vertically shiftable keeper body designed to seat in said pocket and having a lower recess adapted to engage over said rib, said keeper body having the forward face inclined downwardly and inwardly through the link acting to raise said keeper from its seat by pressing against said inclined face and passing beneath the keeper upon said U-shaped rib, and oscillatory means for raising said keeper to release the link.

In testimony whereof I affix my signature.

JOHN ANDREWS.